United States Patent
Eriksson et al.

(10) Patent No.: US 9,247,460 B2
(45) Date of Patent: Jan. 26, 2016

(54) ADJUSTMENT OF LINK ADAPTATION PARAMETER BASED ON DATA AND CONTROL CHANNEL LOAD

(75) Inventors: Erik Eriksson, Linköping (SE); Kristina Jersenius, Linköping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 98 days.

(21) Appl. No.: 13/576,713

(22) PCT Filed: Mar. 9, 2010

(86) PCT No.: PCT/SE2010/050265
§ 371 (c)(1),
(2), (4) Date: Aug. 2, 2012

(87) PCT Pub. No.: WO2011/112125
PCT Pub. Date: Sep. 15, 2011

(65) Prior Publication Data
US 2012/0300742 A1    Nov. 29, 2012

(51) Int. Cl.
*H04W 72/12* (2009.01)
*H04W 28/18* (2009.01)
(Continued)

(52) U.S. Cl.
CPC ............... *H04W 28/18* (2013.01); *H04L 1/001* (2013.01); *H04L 1/0004* (2013.01); *H04L 1/0005* (2013.01); *H04L 1/0011* (2013.01); *H04L 1/0021* (2013.01); *H04L 1/0033* (2013.01); *H04W 72/0486* (2013.01)

(58) Field of Classification Search
CPC ... H04W 28/04; H04W 72/04; H04W 72/042; H04W 88/08; H04L 5/0007
USPC ................................. 370/329; 455/450, 509
See application file for complete search history.

(56) References Cited

U.S. PATENT DOCUMENTS

| 5,563,883 A * | 10/1996 | Cheng ........................... 370/449 |
| 6,094,444 A * | 7/2000 | Auer ............................. 370/535 |
| 7,206,332 B2 * | 4/2007 | Kwan et al. .................... 375/140 |

(Continued)

FOREIGN PATENT DOCUMENTS

| WO | WO 2007063426 A2 * | 6/2007 | ............... H04Q 7/36 |
| WO | 2009090582 A1 | 7/2009 | |

OTHER PUBLICATIONS

Kawamura, Teruo; Kishiyama, Yoshihisa; Higuchi, Kenichi; Sawahashi, Mamoru; Layer 1/Layer 2 Control Channel Structure in Single-Carrier FDMA Based Evolved UTRA Uplink, 1550-2252/$25.00 © 2007 IEEE.*

(Continued)

*Primary Examiner* — Melvin Marcelo
*Assistant Examiner* — Peter Solinsky
(74) *Attorney, Agent, or Firm* — Coats & Bennett, PLLC

(57) ABSTRACT

A method for performing link adaptation in association with scheduling a data channel for a cell in a base station of a cellular communication system, and an arrangement, suitable for performing such a method. The link adaptation method has link adaptation optimization purpose which is achieved by updating a link adaptation parameter on the basis of the load on the data channel and on the basis of the load of a control channel controlling the data channel in the cell. The method obtains a better trade-off between the spectral efficiency and the delay, due to re-transmissions.

20 Claims, 4 Drawing Sheets

(51) Int. Cl.
*H04L 1/00* (2006.01)
*H04W 72/04* (2009.01)

(56) References Cited

U.S. PATENT DOCUMENTS

| | | | |
|---|---|---|---|
| 7,660,279 B2 | 2/2010 | Brueck et al. | |
| 7,769,043 B2* | 8/2010 | Cimini et al. | 370/470 |
| 7,991,413 B2* | 8/2011 | Honkanen et al. | 455/501 |
| 8,085,661 B2* | 12/2011 | Harada et al. | 370/230 |
| 8,185,124 B2* | 5/2012 | Antic et al. | 455/452.1 |
| 8,503,378 B2* | 8/2013 | Miki et al. | 370/329 |
| 8,634,375 B2* | 1/2014 | Huang et al. | 370/330 |
| 8,761,080 B2* | 6/2014 | Mese et al. | 370/318 |
| 2002/0060998 A1* | 5/2002 | Hunzinger | 370/335 |
| 2003/0040315 A1* | 2/2003 | Khaleghi et al. | 455/435 |
| 2004/0066762 A1* | 4/2004 | Alastalo | 370/329 |
| 2004/0166835 A1 | 8/2004 | Johansson et al. | |
| 2004/0184482 A1* | 9/2004 | Gronberg et al. | 370/477 |
| 2006/0067270 A1 | 3/2006 | Gilliland et al. | |
| 2006/0084389 A1* | 4/2006 | Beale et al. | 455/67.11 |
| 2006/0176942 A1* | 8/2006 | Oksman et al. | 375/222 |
| 2007/0096244 A1* | 5/2007 | Roth | 257/478 |
| 2007/0293171 A1* | 12/2007 | Li et al. | 455/185.1 |
| 2009/0268693 A1* | 10/2009 | Lindh et al. | 370/336 |
| 2010/0014474 A1* | 1/2010 | Miki et al. | 370/329 |
| 2010/0027450 A1* | 2/2010 | Montojo et al. | 370/311 |
| 2011/0310853 A1* | 12/2011 | Yin et al. | 370/335 |
| 2012/0028644 A1* | 2/2012 | Li | 455/436 |
| 2012/0106466 A1* | 5/2012 | Kuusela et al. | 370/329 |
| 2012/0202504 A1* | 8/2012 | Wegmann et al. | 455/438 |
| 2012/0207124 A1* | 8/2012 | Liu et al. | 370/329 |
| 2013/0010730 A1* | 1/2013 | Wu et al. | 370/329 |
| 2013/0163547 A1* | 6/2013 | Deu-Ngoc et al. | 370/329 |
| 2013/0165176 A1* | 6/2013 | Carter et al. | 455/522 |
| 2013/0301576 A1* | 11/2013 | Miki et al. | 370/329 |
| 2013/0343308 A1* | 12/2013 | Lee et al. | 370/329 |
| 2014/0064250 A1* | 3/2014 | Wager et al. | 370/331 |

OTHER PUBLICATIONS

Tanno, Motohiro; Kishiyama, Yoshihisa; Miki, Nobuhiko; Higuchi, Kenichi; Sawahashi, Mamoru; Evolved UTRA—Physical Layer Overview, 1-4244-0955-1/07/$25.00 © 2007 IEEE.*

Puttonen, J.; Henttonen, T.; Kolehmainen, N.; Aschan, K.; Moisio, M.; Kela, P.; "Voice-Over-IP Performance in UTRA Long Term Evolution Downlink," Vehicular Technology Conference, 2008, VTC Spring 2008, IEEE, vol. no. pp. 2502-2506, May 11-14, 2008, p. 2502, col. 2, line 9-line 10.

* cited by examiner

ADJUSTMENT OF LINK ADAPTATION PARAMETER BASED ON DATA AND CONTROL CHANNEL LOAD

TECHNICAL FIELD OF THE INVENTION

The present document relates to the field of link adaptation in a communication system.

BACKGROUND ART

In order to improve system capacity, peak data rate and coverage reliability, the signal transmitted to and by a particular user is modified to account for the signal quality variation through a process commonly referred to as link adaptation. Adaptation Modulation and Coding (AMC) is a technology which is commonly used in communication system for achieving spectral efficient transmission. With AMC a communication system tries to select a modulation and coding scheme (MCS) which matches an instantaneous channel used by a cell. If a too aggressive MCS is used there is a severe risk that data transmitted via the channel will not be detected by the receiver while in case a too robust MCS is used, resources will likely be wasted on unnecessary redundancy.

AMC is often combined with a retransmission protocol to ensure a small grade of packet loss. In many communication systems, including Long Term Evolution (LTE) and High Speed Packet Access (HSPA), A Hybrid Automatic Repeat Request (HARQ) is used. With HARQ the receiver first tries to decode received data. If the receiver fails to decode the data it notifies the transmitter from which the data was sent, which will then resend the data. The receiver is then adapted to combine data received from both transmission attempts to try to perform a new decoding.

In order to maximize the spectral efficiency in a cell it is often promising to aim at having few re-transmissions. A retransmission rate of about 10% has proven to be good. A high number of retransmissions will increase the delay, since retransmissions are time consuming. However, transmissions performed with a too robust MCS may increase the delay in a typical multi-user system, since all or most data channels may be occupied.

In the 3GPP LTE Rel.8 standard both AMC and HARQ are suggested to be used for the purpose of obtaining an efficient link adaptation in both uplink (UL) and downlink (DL). According to this standard a User Equipment (UE) is also signaled a resource and MCS on the Physical Downlink Control Channel (PDCCH) both for UL transmission on the Physical Uplink Shared Channel (PUSCH) and DL Reception on the Physical Downlink Shared Channel (PDSCH). Retransmissions in the DL are also signaled on the PDCCH while retransmissions for the UL are signaled either on the PDCCH or triggered automatically by feeding back a negative HARQ acknowledgement (NACK) to the UE ON THE Physical HARG Indicator Channel (PHICH). If signaled on the PHICH the retransmission will occur with the parameters given for the previous transmission attempt.

Link adaptation may be optimized for spectral efficiency or for minimized delay or more commonly as a tradeoff between the two. It is also commonly known that different link adaptation mechanisms may be used for different types of traffic, where, by way of example, delay sensitive traffic, such as e.g. Voice over IP (VoIP), may have a lower Block Error Rate (BLER) than traffic associated with file download. It is commonly known that delay is not only affected by the link adaptation, but that also the scheduling of resources to users has an effect on the delay. If there are many users in a system the duration of time until scheduled for a user having data to send may have more effect on the delay than the transmission attempts required for the data delivery. A consequence from this fact is that a link adaptation obtained for and suitable for one traffic scenario will probably be very unsuitable for another traffic scenario.

SUMMARY OF THE INVENTION

It is an object of the present document to address the problematic issues mentioned above, such that a link adaptation can be achieved such that a better trade-off between the spectral efficiency and the delay is obtained.

These and other objects are achieved by a suggested link adaptation method and an arrangement which is suitable to perform the suggested method.

According to one aspect, a method for performing link adaptation in association with scheduling a data channel for a cell in a base station of a cellular communication system is provided. According to the suggested method the link adaptation may be optimized by updating a link adaptation parameter on the basis of the load on the data channel and on the basis of the load of a control channel controlling the data channel in the cell. The method refers to a process for adapting a parameter associated with a specific channel-pair, and, thus, the suggested link adaptation principle may be applied for any type of channel pair for which a more optimal link adaptation is required.

According to one embodiment, the load may be defined as a state of the cell with respect to the channels, wherein at any occasion the cell can be in any of a Non Limited (NL) state, a Control Channel Limited (CCL) state or a Data Channel Limited (DCL) state. The state of the cell can e.g. be obtained by considering the status of a scheduler being exposed to link adaptation.

More specifically, the method may be obtained by performing the steps of: a) performing a scheduling of a data channel; b) determining the load of the data channel and a control channel controlling the data channel, and c) updating the link adaptation parameter on the basis of the load, in case the load indicates that the cell is either in the CCL or in the DCL state.

According to an alternative embodiment, also power limitation may be considered such that the link adaptation parameter is updated only in case the scheduled users have been estimated not to be power limited. Such an estimation may typically be performed by the scheduler on the basis of conventional estimation procedures.

According to one embodiment, which can be easily be implemented in a conventional system the method comprises the further steps of repeating steps a) and b) for a pre-defined number of consecutive schedulings prior to executing step c), wherein in step c) the link adaptation parameter is updated on the basis of an average load, where the average load is based on statistics on the load determinations executed in association with the pre-define number of consecutive scheduling. A link adaptation which is based on the suggested method may thus be based on the load determined after one scheduling or, on an average load value determined after a plurality of separate scheduling. In the latter case, use of statistics on a series of consecutive scheduling may obtain a more stable link adaptation process.

When applying the suggested method a scheduling decision is made by the scheduler subsequent to having performed a scheduling, i.e. a new decision is taken subsequent to each scheduling, but the updating of the link adaptation parameter is not executed until after the final scheduling of a pre-define number of consecutive scheduling have been performed.

According to another alternative embodiment, which may be applied if a faster link adaptation process is required, a plurality of scheduling may be performed, where each scheduling is associated with a link adaptation parameter updating. More specifically steps a), b) and c) mentioned above are repeated until, in step b), the load indicates that the cell is in the NL state, or until the load indicates a state transition from the CCL state to the DCL state, or vice versa, between the two latest schedulings. When the latter embodiment is applied, a scheduling decision is postponed until the last of the scheduling/s has been completed, or in other words, until no more parameter updating is required, according to predefined adaptation conditions.

For both embodiments suggested above the method will typically be arranged such that during step c), the link adaptation parameter is updated such that the link adaptation becomes more robust, in case the load indicates that the cell is in the CCL state, or such that the link adaptation parameter is updated such that the link adaptation becomes more aggressive, in case the load indicates that the cell is in the DCL state. These requirements may be obtained by increasing or decreasing the adaptable parameter accordingly, depending on the type of parameter.

The parameter adaptation may be performed such that a default link adaptation parameter value to be used as a starting value for the link adaptation parameter is defined prior to executing step a). Based on the default value, the adaptation in step c) may then be performed such that the link adaptation parameter is increased with a predetermined updating value in case the cell is found to be in one of the DCL state or the CCL state; such that the link adaptation parameter is decreased with the predetermined updating value in case the cell is found to be in the other one of the DCL state or the CCL state, and such that the link adaptation parameter remains unchanged in case the cell is found to be in the NL state. In which direction to change the link adaptation parameter will depend on type of parameter and its behavior.

According to one embodiment, the link adaptation parameter may be a Block Error Rate (BLER) target of the data channel of the cell.

The suggested method enabling a more flexible link adaptation may provide for better capacity both in terms of cell throughput and the number of VoIP users that can be supported within a cell of a communication system.

According to another aspect an arrangement in a base station of a cellular communication system which is suitable for performing the method described above is suggested. The arrangement comprises a scheduler for performing scheduling and is configured to perform link adaptation in association with scheduling a data channel for a cell of the base station.

The arrangement comprises an updating unit which is configured to perform an optimized link adaptation at the scheduler by updating a link adaptation parameter on the basis of the load on the data channel and on the basis of the load of a control channel controlling the data channel in the cell.

In order to be able to determine the load of a channel-pair, the exemplifying arrangement also comprises a load determining unit which is configured to determine the load by determining a state of the cell with respect to said channels, as described above.

The updating unit is configured to update the link adaptation parameter on the basis of the load determined by the load determining unit, subsequent to a scheduling of the data channel resources being performed by the scheduler, in case the load indicates that the cell is in the CCL state or DCL state.

In addition, the scheduler (401) may also be configured to consider power limitation possibilities, by way of estimating whether or not users which have been scheduled by the scheduler are power limited. In such a situation, the updating unit may also be configured such that it updates the link adaptation parameter only in case the scheduled users are estimated not to be power limited.

According to one exemplary embodiment, describing an arrangement which is suitable for performing the method according to the first embodiment described above, the scheduler is configured to perform a pre-defined number of consecutive schedulings, and the updating unit is configured to update the link adaptation parameter subsequent to the final scheduling of the pre-defined number of consecutive schedulings on the basis of an average load. In order to obtain such an average load measure, the load determining unit is configured to determine an average load on the basis of statistics on the load determinations executed in association with the pre-defined number of consecutive scheduling. The scheduler is further configured to make a scheduling decision subsequent to having performed a scheduling.

According to another, alternative embodiment, describing an arrangement which is suitable for performing the method according to the second embodiment described above, the scheduler is configured to perform at least one repeated scheduling in response to being provided with a link adaptation parameter update from the updating unit, and wherein the load determining unit is configured to instruct the updating unit to update the link adaptation parameter subsequent to a scheduling, until the scheduler indicates to the load determining unit (403) that the cell is in the NL state, or until the load determining unit (403) recognises that a state transition from the CCL state to the DCL state, or vice versa, has occurred between the two latest schedulings. In the latest embodiment the scheduler may further be configured to postpone the scheduling decision such that a scheduling decision is made on the basis of the last of the scheduling/s.

According to any of the suggested embodiments, the updating unit is typically also configured to update the link adaptation parameter such that the link adaptation becomes more robust, in case the load indicates that the cell is in the CCL state, or to update the link adaptation parameter such that the link adaptation becomes more aggressive, in case the load indicates that the cell is in the DCL state.

According to one exemplifying embodiment, the updating unit is configurable such that a default link adaptation parameter value is initially defined as a starting value for the link adaptation parameter, and wherein the updating unit is further configured to: increase the link adaptation parameter with a predetermined updating value in case it is informed by the load determining unit that the cell is in one of the DCL state or the CCL state; to decrease the link adaptation parameter with the predetermined updating value in case it is informed by the load determining unit that the cell is in the other one of the DCL state or the CCL state, and to maintain the link adaptation parameter unchanged in case it is informed by the load determining unit that the cell is in the NL state.

Other features and further advantages of the invention will be apparent from the description following below and the associated figures, as well as from the appended claim.

BRIEF DESCRIPTION OF THE DRAWINGS

The invention will now be described, by way of example, with reference to the accompanying drawings, in which.

DETAILED DESCRIPTION

Below a method for performing link adaptation by considering the load on a data channel and a control channel, controlling the data channel, will be described in further detail. One purpose with the suggested method is to try to obtain a satisfying tradeoff between the spectral efficiency and the delay for most of the traffic scenarios that may appear, by adapting a link adaptation parameter in association with scheduling channel resources. The suggested method is especially applicable for delay sensitive traffic, such as e.g. Voice over IP (VoIP).

Figure 1:
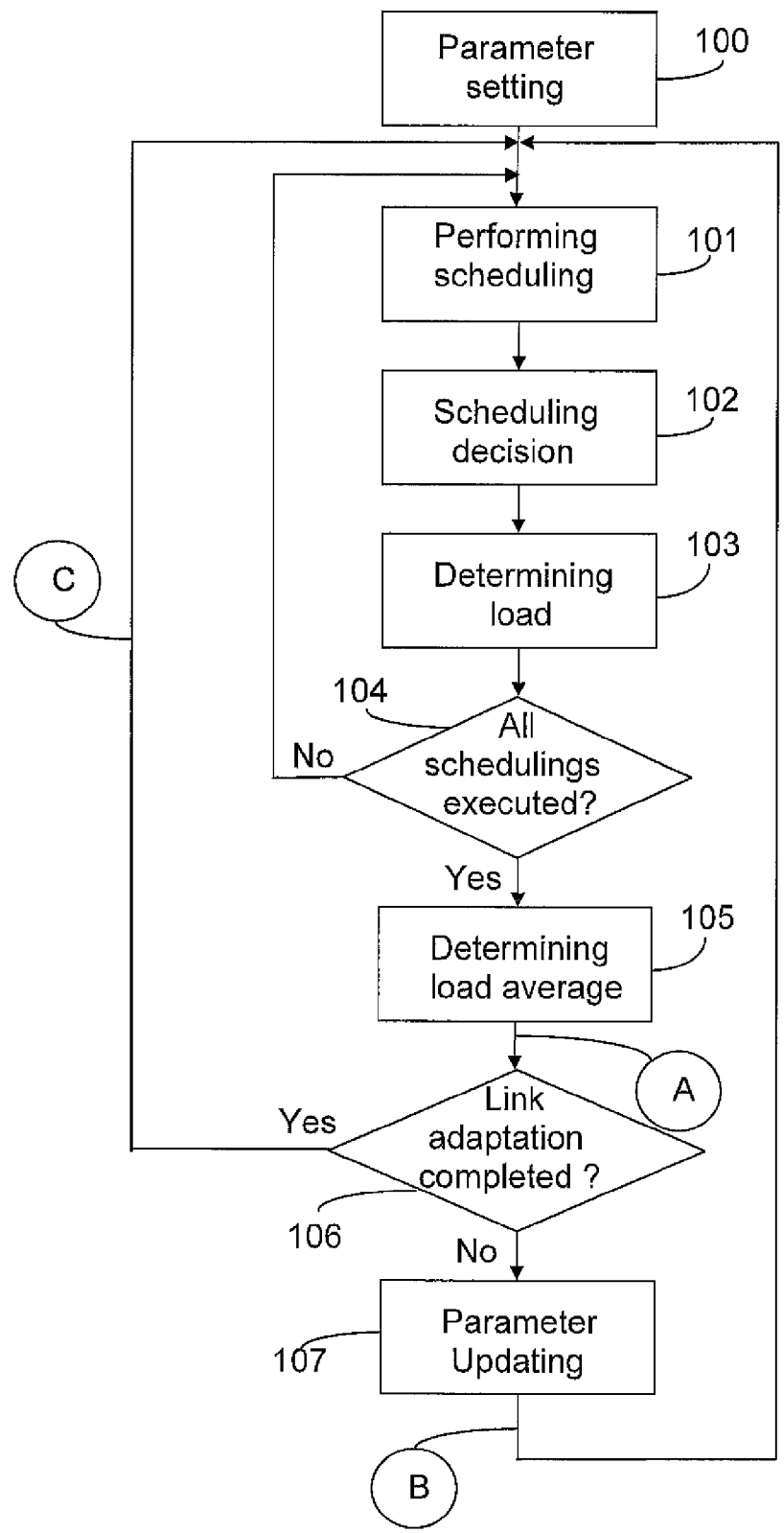
FIG. 1 is a flow chart, illustrating a link adaptation method according to one embodiment.

FIG. 1 illustrates a method for performing link adaptation in association with scheduling of data channel resources for a cell of a base station according to a first embodiment, describing an updating method which may be referred to as an interaction with an outer loop. The suggested method is suitable for execution on an existing standardized communication system, where focus is on a robust and simple adaptation process. The first embodiment focus on a data channel, where the limiting factor may be either the data channel itself or an associated control channel which is assigning resources to the data channel, where control channel assigning resources are used for required retransmissions. By way of example the data channel may be the PDSCH, which is controlled by the PDCCH.

In a first step 100 a parameter which is subjected to link adaptation is set to an appropriate default value (Ptarget). Preferably, an upper limit (Pmax) is also defined for the parameter at this initial stage, limiting the adaptation rage. A typical parameter may be the Block Error Rate (BLER) target, where the default value for the BLER target is set to give a good trade-off between spectral efficiency and delay, while a selected upper limit for the BLER target will maximize the spectral efficiency on the data channel. How to set BLERtarget may vary depending on the present circumstances, including the channels under consideration. In the case of link adaptation in association with scheduling of the PDSCH, controlled by the PDCCH, BLERtarget may e.g. be set to 10%.

In a next step 101, scheduling of the data channel resources is executed. The scheduling process of step 101 may be executed once before a parameter updating is executed. An alternative approach is applied by arranging for a pre-defined number of schedulings to commence before updating the link adaptation parameter. In the latter case a load is determined, not only subsequent to each scheduling, but also subsequent to the completion of the final of the pre-defined number of scheduling, where a load average, is determined in the basis of the load measures. The link adaptation parameter updating is then based on this average load value.

Subsequent to a scheduling, a scheduling decision is made by the scheduler, as indicated with as step 102, and a channel load, considering the load on the data and the associated control channel, is determined, as indicated with another step 103. Steps 101-103 may be referred to as one scheduling epoch. In a next step 104, it is determined when all of a predefined number of scheduling epochs have been completely executed.

Once the pre-defined number of scheduling epochs has been executed, an average load, determined on the basis of statistics on all load determination results of a scheduling epoch, is executed, as indicated in a subsequent step 105. As a consequence, in case only one scheduling epoch is to be executed, step 105 is omitted. In the present context a rough indication of the load may be sufficient. Therefore an estimation of the state of the cell with respect to the data channel and the associated control channel, giving an indication on whether the cell is in a control channel limited state, a data channel limited state, or, in case requested resources can be scheduled, in a not limited state. These states may be obtained by considering the status of the scheduler, which may be achieved according to well known procedures. These procedures are consequently not within scope of the present invention, and will therefore not be described in any further detail in this document.

On the basis of the determined load, or load average, the link adaptation parameter is updated, as indicated with another step 107, in case it was not determined in a previous step 106, that the load indicates that the cell is in the unlimited state. In the latter case no updating will be required for the executed scheduling epochs, and a new series of consecutive scheduling epochs may commence, as indicated with the "No" branch of step 106. If, subsequent to the one or more scheduling epochs, all users have received all their requested resources all the load on the channels is not critical and the cell is in the Non Limited (NL) state, while if all data channel resources are used up the cell is in a Data Channel Limited (DCL) state. If instead not enough control channel resources are available, the cell is in the Control Channel Limited (CCL) state.

The scheduling decision will be transmitted to a UE requesting resources in a control channel message, which may be a downlink (DL) channel assignment or an uplink (UL) grant, which includes the scheduling decision such that for DL requests, the scheduler may instruct a processing unit to transmit data via allocated resources, while for UL, the scheduler will instead send a scheduling decision to a requesting UE in the form of an uplink grant, informing the UE that is should transmit data.

Another embodiment, which is normally faster than the previous embodiment but requires more processing resources, will now be described in general terms below with reference to FIG. 2. According to this alternative embodiment, a link adaptation parameter is instead updated by applying interaction with instant update. In this alternative embodiment, the instantaneous state of the cell is instead detected after a scheduling, which may be referred to as a test scheduling, has been executed, and an adjustment of the link adaptation parameter will be executed, The described process may be repeated until either the cell is in the NL state, or until a cell state transition from the DCL state to the CCL state, or vice versa, is identified. Not until such a parameter updating process has been completely executed, is a scheduling decision taken.

Steps 200 and 201 correspond to the first initial steps of the method described above with reference to FIG. 1. However, compared to the first embodiment, other default values (Ptarget), and if applicable, upper limit values (Pmax) should typically be chosen in step 200. However, on the basis of the result from the scheduling executed in step 201, the load/state of the cell is determined in, as indicated in step 202. The scheduling can be referred to as a test scheduling, which may followed by one or more repeated test schedulings, until the load meet predefined load conditions, as indicated with the loop expressed by steps 201 to 204, In a next step 203 it is therefore determined if the scheduling can be considered as completed, according to the requirements. Compared to the first embodiment, where a scheduling decision was transmitted to the UE's after each scheduling, a scheduling is not sent until the link adaptation results in the predefined load conditions. In one exemplary implementation the described iterative link adaptation process may commence until the load/cell state switches between the DCL and the CCL state, or vice versa, or until it reaches the NL state. Once the scheduling decision has been taken by the scheduler, a new process, comprising one or more test scheduling may start.

Figure 3:
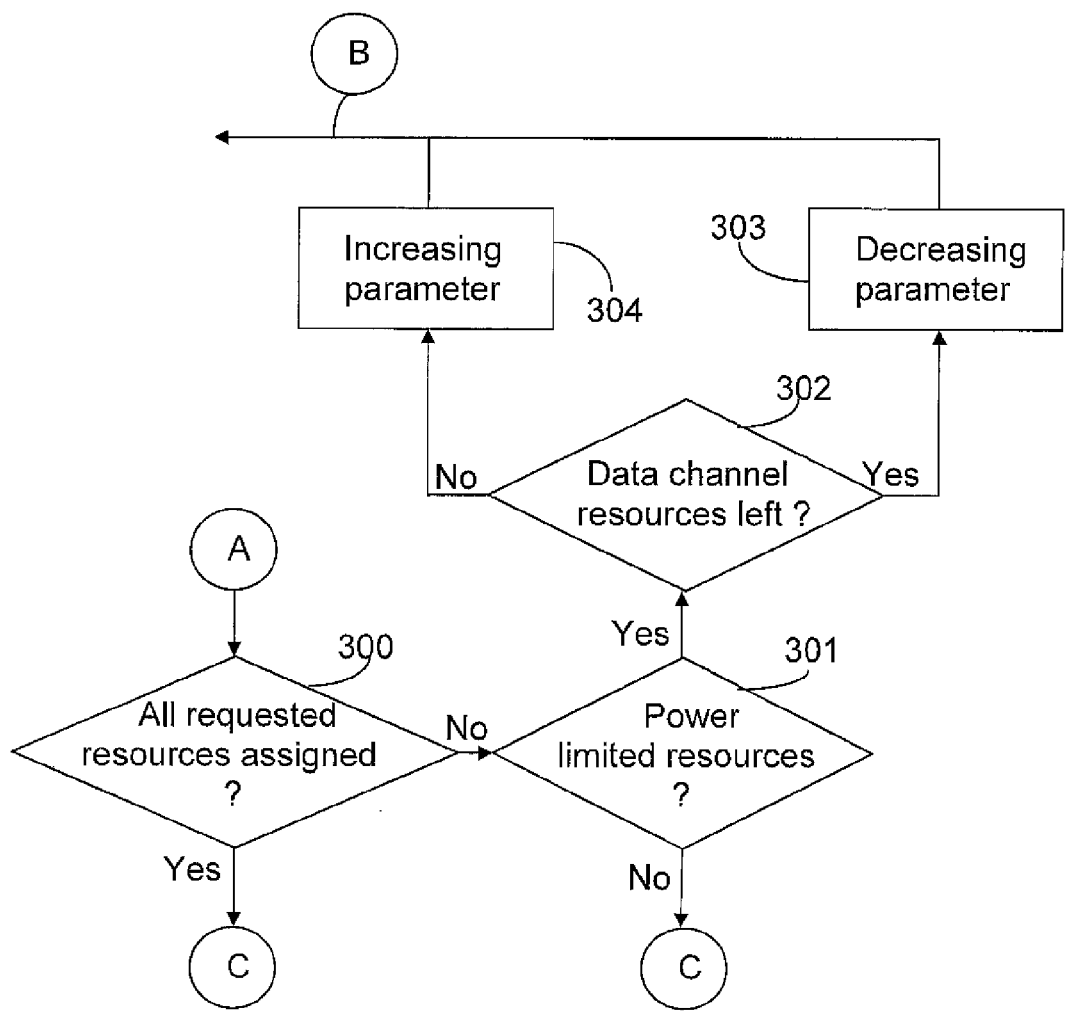
FIG. 3 is yet another flow chart, illustrating how a parameter adaptation may be executed in any of the two methods described with reference to FIGS. 1 and 2, according to one exemplary embodiment.

A typical scenario, describing how the updating decision may be taken in step 106 or 203 respectively, and how a subsequent updating may be executed, according to step 107 or 204, respectively, will now be described in further detail with reference to FIG. 3. The described scenario is applicable for adapting parameters, such as e.g. BLER target, but the same general principle is applicable also for other choices of parameter.

Figure 2:
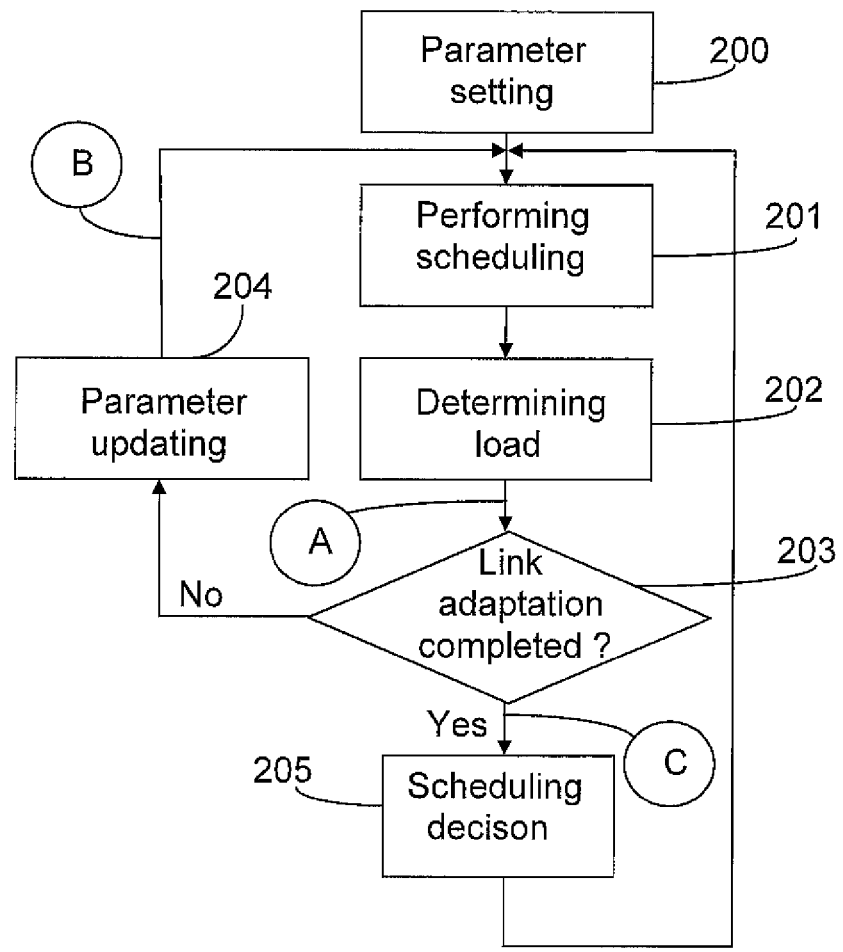
FIG. 2 is another flow chart, illustrating an alternative link adaptation method according to another embodiment.

Starting at branch A of FIG. 1 or 2, i.e. subsequent to having determined the load, or load average, it is determined whether, depending on the load, a parameter adaptation is required, as indicated with a step 300. More specifically it is determined whether or not all resources requested could actually be assigned during the preceding scheduling. If not all resources could be assigned, the cell is obviously in the NL state, and no adaptation will be required, while if at least some requested resources could not be assigned at the scheduling a performed adaptation of the link adaptation parameter is to be executed such that at the subsequent scheduling, the adapted link parameter will hopefully provide for better scheduling performance. It is to be understood that the described scenario refers to the case where updating is performed as long as the load does not indicate the NL state. If no updating is to be executed subsequent to a state transition from CCL to DCL, or vice versa, also such a condition is to be considered such that no transition results in the "No" branch of step 300, while in case of a transition, the process commences to branch C.

As indicated in the figure it may also be determined whether or not power limitation has to be taken into account, in addition to the load, as indicated with optional step 301. In case of power limitation for the requested resources, i.e. it cannot be determined whether channel limitation is the cause of a non-optimal scheduling decision, or if an inappropriate amount of power resources of a UE is the cause of not being able to make use of the scheduled resources. The power situation may be determined by the scheduler by executing commonly known estimation procedures on a respective UE, and, thus, these procedures will not be discussed in any further detail in the present document.

In case of no power limitation it is at a next stage determined whether there were any data channel resources left after the latest scheduling, as indicated with another step 302. If this is the case, the control channel is the limiting resource and thus the cell is in the CCL state. In response, the link adaptation parameter is adapted such that the link adaptation becomes more robust. This is indicated with step 303. For the case of BLER target, this means that the parameter is decreased with a pre-defined updating value. Otherwise, the cell is found to be in the DCL state, and the parameter is instead adapted such that a more aggressive link adaptation is obtained. Applied to BLERtarget this would mean that the parameter is increased with the pre-defined updating value, as indicated with another alternative step 304. For another link adaptation parameter, such as e.g. a channel quality estimation back off, the opposite may apply, i.e. if it was found in step 302 that there were data channel resources left, the channel quality estimation back off is instead increased. Once the link adaptation parameter has been updated accordingly, the process continues with branch B of FIG. 1 or 2, respectively.

In order to limit the adaptation range an upper limit is preferably applied, by defining an upper limit, Pmax, for the link adaptation parameter such that increasing of the parameter never result in a parameter value which exceeds Pmax. A Pmax may e.g. be preferred if the link adaptation parameter is BLERtarget. In another scenario, e.g. if channel quality estimation back off is used as a link adaptation parameter, a lower limit may instead be preferred such that the parameter is never set to a value exceeding a Pmin.

An arrangement suitable for implementation in a base station of a cellular communication system for the purpose of enabling the link adaptation method described above will now be described in further detail below with reference to FIG. 4. It is to be understood that the suggested arrangement merely represents one possible configuration which makes it possible to perform the suggested link adaptation method, and that also other alternative configurations which may be based on other combinations of the described functional entities may be applicable.

Figure 4:
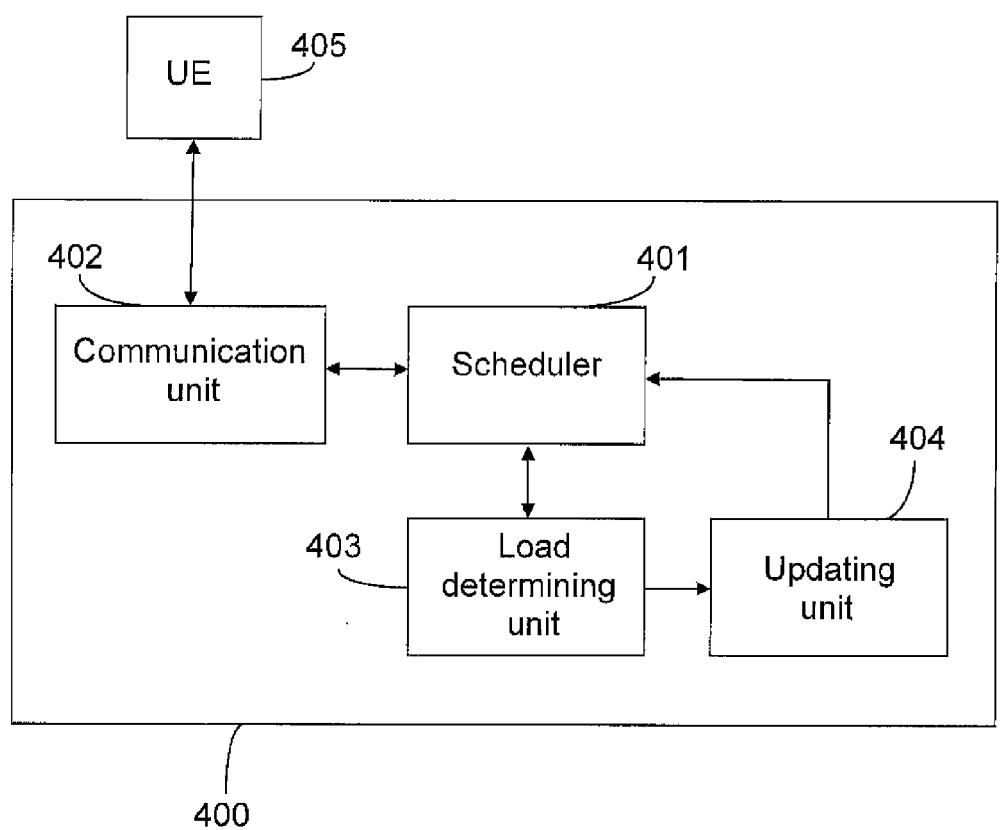
FIG. 4 is a block scheme, illustrating an arrangement which is suitable for executing any of the methods described with reference to FIGS. 1 and 2, according to one exemplary embodiment.

The arrangement 400 according to FIG. 4 comprises a Communication Unit 402, which may be any type of conventional functional unit providing conventional communication functionality, thereby enabling UEs, here represented by UE 405, access to the arrangement 400, and a scheduler 401 for scheduling data channel resources and which is adapted for link adaptation according to the suggested method. The scheduler 401 may be configured to perform one or a plurality of repeated schedulings, where each scheduling is followed by a scheduling result such that a parameter updating is executed once all schedulings have been executed. Alternatively, it may be configured to perform one or more schedulings, which may be referred to as test scheduling, as long as an updated parameter is provided to the scheduler 401, subsequent to a scheduling. In the latter case, the scheduler 401 is configured to postpone the scheduling decision until no more updating are required. Arrangement 400 also comprises an Updating Unit 404, which is configured to optimize the link adaptation by sequentially updating a selected link adaptation parameter on the basis of the load of the data channel and the control channel controlling the data channel.

The load of the cell is used as input data to the updating unit 404 and may be determined by a dedicated functional unit, such as e.g. the Load Determining Unit 403 of FIG. 4, which is configured to determine a load indication on the basis of input data obtained from the scheduler 401, subsequent to a scheduling performed by the scheduler 401, and to provide the determined load indication to the updating unit 404.

If the exemplary scenario described above is applied, the load determining unit 403 may be configured to determine the load by determining the state of the cell, wherein the cell can be in a NL state, CCL state or DCL state. Such a state detection process may be executed e.g. by considering the status of the scheduler 401, subsequent to a scheduling.

Updating unit 404 may be configured to update the link adaptation parameter on the basis of the load of the cell provided from the load determining unit 403 in response to one single scheduling, or in response to a plurality of pre-defined number of consecutive schedulings. In the former case the load determining unit 403 always determine the load responding from the latest scheduling, while in the latter case the load determining unit 403 is configured to determine the load after each scheduling, and, subsequent to the final scheduling of the predetermined number of scheduling, the load determining unit 403 is configured to also determine an average load, or an average state, on the basis of all load determination associated with the predetermined number of scheduling, and to provide the resulting load/state to the updating unit 404, forming a basis for an updating decision. If after a majority of the scheduling, the cell was in the NL state, the state decisive for the link adaptation is the NL state, the NL state is provided to the updating unit 404, by the load determining unit 403, and, thus, no link adaptation will be executed by updating unit 404.

The updating unit 404 is typically configured to update the link adaptation parameter according to the conditions mentioned above, i.e. such that in case the load indicates that the cell is in the CCL, the updating unit is configured to adapt the link adaptation parameter such that the link adaptation becomes more robust, while if the cell is instead in the DCL state, according to the load provided to the updating unit 4040, the updating unit 4040 is configured to update the link adaptation parameter such that the link adaptation becomes more aggressive.

It is to be understood the suggested method and arrangement may be applied in any type of context and for any type of communication systems, including LTE and HSPA, where link adaptation is required for obtaining an efficient scheduling of resources. It is also to be understood that the suggested link adaptation mechanism may be applied for any type of data/user channel pair.

It is also to be understood that the network nodes, units and functional entities suggested above are to be seen as exemplary entities which may be combined in other ways, or named differently. A base station may e.g. be an eNodeB if the method is applied in an LTE system, or any other type of base station in case of implementation in another type of communication system.

The suggested method and the associated arrangement have been described with reference to specific exemplary embodiments and figures only to illustrate the inventive concept. The inventive concept is, however, not limited to the disclosed embodiments, but should instead be seen as an intention to cover various possible modifications which may lie within the scope of the appended claims.

ABBREVIATIONS

AMC Adaptation Modulation and Coding
BLER Block Error Rate
DL Downlink
HARQ Hybrid Automatic Repeat Request
HSPA High Speed Packet Access
LTE Long Term Evolution
MCS Modulation and Coding Scheme
NACK Negative Acknowledgement
PDCCH Physical Downlink Control Channel
PDSCH Physical Downlink Shared Channel
PUSCH Physical Uplink Shared Channel
UE User Equipment
UL Uplink

The invention claimed is:

1. A method for optimizing link adaptation in association with scheduling a data channel for a cell in a base station of a cellular communication system, the method comprising:
  determining that the cell is in one of:
    a Data Channel Limited (DCL) state due to users having not received their requested resources as a consequence of insufficient data channel resources;
    a Control Channel Limited (CCL) state due to the cell not being in a DCL state and users having not received their requested resources as a consequence of insufficient control channel resources;
    a Non Limited (NL) state due to the cell not being in the DCL state and not being in the CCL state;
  updating a link adaptation parameter based on:
    a load of the data channel; and
    a load of a control channel;
    wherein the control channel is distinct from the data channel and is purposed for assigning resources to the data channel.

2. The method of claim 1, further comprising:
  a) performing a scheduling of the data channel resources;
  b) determining the load of the data channel and the load of the control channel controlling the data channel;
  c) updating the link adaptation parameter based on the loads indicating that the cell is in the CCL state or the DCL state.

3. The method of claim 2, wherein step c) is conditional based on corresponding scheduled users being estimated not to be power limited.

4. The method of claim 2:
  further comprising repeating steps a) and b) for a pre-defined number of consecutive schedulings prior to executing step c);
  wherein in step c) the link adaptation parameter is updated based on an average load, the average load being based on statistics on the load determinations executed in association with the pre-defined number of consecutive schedulings.

5. The method of claim 2, wherein step a) comprises making a scheduling decision subsequent to having performed a scheduling.

6. The method of claim 2, wherein steps a), b) and c) are repeated until, in step b), the loads indicate:
  that the cell is in the NL state;
  a state transition from the CCL state to the DCL state between two most recent schedulings; or
  a state transition from the DCL state to the CCL state between the two most recent schedulings.

7. The method of claim 6, further comprising making a scheduling decision based on a most recent scheduling.

8. The method of claim 2, wherein during step c), the link adaptation parameter is updated such that:
  the link adaptation reduces retransmissions in response to determining that the cell is in the CCL state;
  the link adaptation increases data rate in response to determining that the cell is in the DCL state.

9. The method of claim 2:
  further comprising, prior to executing step a), defining a default link adaptation parameter value to be used as a starting value for the link adaptation parameter;
  wherein the parameter adaptation in step c) is performed such that the link adaptation parameter:
    is increased by a predetermined updating value, in response to the cell being in one of the DCL state and the CCL state;
    is decreased by the predetermined updating value in response to the cell being in the other of the DCL state and the CCL state;
    remains unchanged in response to the cell being in the NL state.

10. The method of claim 1 wherein the link adaptation parameter is a Block Error Rate target of the data channel of the cell.

11. A base station of a cellular communication system for optimizing link adaptation in association with scheduling a data channel for a cell of the base station, the base station comprising:
a processor and a memory, the memory containing instructions executable by the processor whereby the base station is configured to:
perform the scheduling;
determine that the cell is in one of:
a Data Channel Limited (DCL) state due to users having not received their requested resources as a consequence of insufficient data channel resources;
a Control Channel Limited (CCL) state due to the cell not being in a DCL state and users having not received their requested resources as a consequence of insufficient control channel resources;
a Non Limited (NL) state due to the cell not being in the DCL state and not being in the CCL state;
update a link adaptation parameter based on:
a load on the data channel; and
a load of a control channel;
wherein the control channel is distinct from the data channel and is purposed for assigning resources to the data channel.

12. The base station of claim 11, wherein the base station is configured to update the link adaptation parameter:
based on load determined subsequent to a scheduling of the data channel resources; and
in response to the cell being in the CCL state or the DCL state.

13. The base station of claim 12, wherein the base station is further configured to:
estimate whether or not users which have been scheduled are power limited; and
update the link adaptation parameter only when the scheduled users are estimated not to be power limited.

14. The base station of claim 12, wherein the base station is further configured to:
perform a pre-defined number of consecutive schedulings;
update the link adaptation parameter subsequent to the final scheduling of the pre-defined number of consecutive schedulings based on an average load;
determine the average load based on statistics on load determinations executed in association with the pre-defined number of consecutive schedulings.

15. The base station of claim 12, wherein the base station is further configured to make a scheduling decision subsequent to having performed a scheduling.

16. The base station of claim 12, wherein the base station is configured to:
perform at least one repeated scheduling in response to being provided with a link adaptation parameter update;
update the link adaptation parameter subsequent to a scheduling, until the base station recognizes:
that the cell is in the NL state;
that a state transition from the CCL state to the DCL state has occurred between two most recent schedulings; or
that a state transition from the DCL state to the CCL state has occurred between the two most recent schedulings.

17. The base station of claim 16, wherein the base station is further configured to make a scheduling decision based on a most recent scheduling.

18. The base station of claim 11, wherein the base station is configured to update the link adaptation parameter such that:
the link adaptation reduces retransmissions in response to determining that the cell is in the CCL state;
the link adaptation parameter increases data rate in response to determining that the cell is in the DCL state.

19. The base station of claim 11:
wherein a default link adaptation parameter value is initially defined as a starting value for the link adaptation parameter;
wherein the base station is further configured to:
increase the link adaptation parameter by a predetermined updating value in response to determining that the cell is in one of the DCL state or the CCL state;
decrease the link adaptation parameter by the predetermined updating value in response to determining that the cell is in the other one of the DCL state or the CCL state;
maintain the link adaptation parameter unchanged in response to determining that the cell is in the NL state.

20. The base station of claim 11, wherein the link adaptation parameter is a Block error Rate target for the data channel of the cell.

* * * * *